United States Patent Office 2,926,155
Patented Feb. 23, 1960

2,926,155

PREVENTING EXPOSURE CRACKING OF RUBBER

Albert J. Greene, St. Louis, Mo., assignor to Monsanto Chemical Company, St. Louis, Mo., a corporation of Delaware No Drawing. Application April 17, 1956
Serial No. 578,590

11 Claims. (Cl. 260—45.9)

This invention relates to the prevention of exposure cracking of sulfur-vulcanizable rubbers. More particularly, the invention is concerned with the inhibition of the deleterious effects of ozone by incorporating into the sulfur-vulcanizable rubber compositions an anti-exposure cracking agent. The invention also relates to the process of improving the resistance to exposure cracking and to the rubber vulcanizates containing the anti-exposure cracking agents.

One of the major problems of the rubber industry is the protection of vulcanizates of sulfur-vulcanizable rubbers against exposure cracking, that is degradation of the vulcanizate due to ozone while under static or dynamic stress. The problem is a serious one, particularly with respect to the service life of rubber tires, and is aggravated by the fact that in general chemical antioxidants have little or no value in protecting vulcanizates against deterioration by ozone. Although many and varied substances have been suggested and tried, not one has been found entirely satisfactory. Accordingly, rubber technologists have constantly sought improvements.

The anti-exposure cracking agents employed in accordance with this invention are anilines containing in the nucleus a lower alkyl group and two lower alkoxy groups. The positions of the alkyl and alkoxy groups are not significant. Examples are 3,5-dimethoxy-p-toluidine, 3,5-dimethoxy-o-toluidine, 2,5-dimethoxy-p-toluidine, 2,6-dimethoxy-p-toluidine, 4,5-dimethoxy-o-toluidine, 4,6-dimethoxy-m-toluidine and 3,5-diethoxy-o-toluidine. These compounds may be made by methods described in the literature although some of them are new compounds. For example, 4,6-dimethoxy-m-toluidine which has not heretofore been described, may be prepared as follows:

To a suitable reaction vessel was charged and intimately mixed 45 parts by weight (0.3 mole) of 4,6-dimethoxy-m-nitrotoluene, 38.2 parts by weight (0.64 mole) of glacial acetic acid, and approximately 191 parts of water. The mixture was heated to reflux (about 100° C.) and with constant agitation refluxed for about two and one-half hours. The mixture was then cooled to about 80° C. and to it was added approximately 42.4 parts by weight of sodium carbonate over a period of about ten minutes. Approximately 132 parts by weight of benzene was incorporated in the mix with agitation, the agitation being continued for about one-half hour after all the benzene was added. The mix was then allowed to stand for about one hour and the benzene layer separated. The undissolved residue of the heterogeneous mix was then extracted with benzene and the extracts combined with the original benzene layer. The solvent was distilled off and upon application of vacuum (10 mm. of Hg) at 139° C., a white solid identified as 4,6-dimethoxy-m-toluidine was obtained in 91.7% theory yield. The crystallizing point of the product was 87.2° C.

As illustrative of the control of exposure cracking of vulcanized sulfur-vulcanizable synthetic rubber-like materials, rubbery butadiene-1,3-styrene copolymer compositions were prepared comprising

| Stock | A | B | C |
|---|---|---|---|
| | Parts by weight | | |
| GR-S 1500 | 100 | 100 | 100 |
| Carbon black | 50 | 50 | 50 |
| Saturated hydrocarbon softener | 10 | 10 | 10 |
| Zinc oxide | 4 | 4 | 4 |
| Stearic acid | 2 | 2 | 2 |
| Sulfur | 1.75 | 1.75 | 1.75 |
| N-Cyclohexyl-2-benzothiazolesulfenamide | 1.2 | 1.2 | 1.2 |
| Anti-exposure cracking agent | | 1.5 | 1.5 |

The ingredients were admixed on a rubber mill in the customary fashion and the respective compounded stocks were cured in a press at 144° C. for 30 minutes. Since evaluation under static conditions is not indicative of the service obtained with many types of rubber articles which must withstand flexing, the vulcanized compositions were evaluated under dynamic conditions in an atmosphere containing a definite concentration of ozone. Samples of the stocks were cured in the form of a belt ½" wide, ¼" thick and 5 5/16" diameter and mounted on 1" diameter shafts. The ozone concentration was maintained at 20–30 parts per hundred million throughout the test and the shafts were rotated at 75 r.p.m. In this manner a momentary elongation through a range of 0–20% was provided at any portion of the test specimen passing over the shaft. (The apparatus and procedure employed is described by Creed et al. in Analytical Chemistry, vol. 25, page 241, February 1953.) The experimental test specimens were compared visually at various intervals noting the extent of cracking. A stock which is severely cracked has no service life remaining in terms of the useful life of a rubber article and where the cracking is designated as extremely severe the degradation is well beyond even this point.

In the table the resistance of Stocks B and C to exposure cracking is illustrated. The value recorded is the ratio of the cracking resistance to that of an untreated control (Stock A) run at the same time. This is a very convenient method of summarizing the relative utility of a number of materials. The data were obtained by assigning a numerical rating as a measure of the degree of cracking and plotting these units on the vertical axis against the time of exposure. The numbers employed and the corresponding descriptions were as follows:

(1) No cracking
(2) Very slight cracking
(3) Slight cracking
(4) Moderate cracking
(5) Severe cracking
(6) Very severe cracking.

A set of stocks answering this description was used as a standard and each stock was compared to this standard so as to assign a comparable numerical rating. The six degrees of cracking were designated on the vertical axis in reverse order, in other words beginning with six nearest the horizontal axis and ending with one at the top. Plotting the numerical ratings against exposure time in this manner gave a curve which approached the horizontal axis as the cracking progressed. Obviously, the greater the area under the curve the greater the degree of protection. Observations were made at intervals, usually after 8, 24, 48, 72 and 96 hours. The areas under the curve were then measured with a planimeter and the area divided by the area for a similar stock run at the same time without any anti-flex cracking agent. The resulting figure is the ratio of the protection as compared to the untreated stock as 100. This value is designated as protection ratio.

Table

| Anti-Exposure Cracking Agent | Protection Ratio |
| --- | --- |
| None (Stock A) | 100 |
| 4,5-Dimethoxy-o-toluidine (Stock B) | 245 |
| 4,6-Dimethoxy-m-toluidine (Stock C) | 250 |

By the terms "vulcanized rubber" and "sulfur-vulcanizable rubber" as employed in the appened claims, unless otherwise modified, is meant natural as well as synthetic rubbers which are capable of vulcanization when heated with sulfur and includes latices and reclaims of such materials.

It is to be understood that other desired filling and compounding ingredients may be incorporated in the rubber base along with the anti-exposure cracking agent. For example, there may be incorporated other accelerators, softeners, etc. as well as the customary rubber antioxidants.

It is intended to cover all changes and modifications of the examples of the invention herein chosen for purposes of disclosure which do not constitute departures from the spirit and scope of the invention.

What is claimed is:

1. A sulfur-vulcanizable diene hydrocarbon rubber vulcanizate having incorporated therein, in amount sufficient to increase resistance to exposure cracking, aniline substituted in the nucleus by a lower alkyl group and two lower alkoxy groups.

2. A sulfur-vulcanizable diene hydrocarbon rubber vulcanizate having incorporated therein, in amount sufficient to increase resistance to exposure cracking, toluidine substituted in the nucleus by two lower alkoxy groups.

3. A sulfur-vulcanizable diene hydrocarbon rubber vulcanizate having incorporated therein, in amount sufficient to increase resistance to exposure cracking, toluidine substituted in the nucleus by two methoxy groups.

4. A vulcanized butadiene-styrene rubber composition containing in small amount sufficient to increase resistance to exposure cracking toluidine substituted in the nucleus by two lower alkoxy groups.

5. A vulcanized rubber composition containing in small amount sufficient to increase resistance to exposure cracking toluidine substituted in the nucleus by two lower alkoxy groups, said rubber being a sulfur-vulcanizable synthetic rubber-like hydrocarbon polymer of an aliphatic conjugated diene compound.

6. A vulcanized rubber composition containing in small amount sufficient to increase resistance to exposure cracking 4,6-dimethoxy-m-toluidine, said rubber being a butadiene-styrene copolymer.

7. A vulcanized rubber composition containing in small amount sufficient to increase resistance to exposure cracking 4,5-dimethoxy-o-toluidine, said rubber being a butadiene-styrene copolymer.

8. The process of improving the resistance to exposure cracking of a sulfur-vulcanizable rubber which comprises incorporating therein in small amount sufficient to increase resistance to exposure cracking, toluidine substituted in the nucleus by two lower alkoxy groups, said rubber being a butadiene-styrene copolymer.

9. The process of improving the resistance to exposure cracking of a sulfur-vulcanizable rubber which comprises incorporating therein in small amount sufficient to increase resistance to exposure cracking 4,6-dimethoxy-m-toluidine, said rubber being a butadiene-styrene copolymer.

10. The process of improving the resistance to exposure cracking of a sulfur-vulcanizable rubber which comprises incorporating therein in small amount sufficient to increase resistance to exposure cracking 4,5-dimethoxy-o-toluidine, said rubber being a butadiene-styrene copolymer.

11. The process of improving the resistance to exposure cracking of a sulfur-vulcanizable rubber which comprises incorporating therein in small amount sufficient to increase resistance to exposure cracking 2,6-dimethoxy-p-toluidine, said rubber being a butadiene-styrene copolymer.

References Cited in the file of this patent

UNITED STATES PATENTS

| 2,166,223 | Semon | July 18, 1939 |
| 2,235,629 | Clifford | Mar. 18, 1941 |

FOREIGN PATENTS

| 479,865 | Great Britain | Feb. 14, 1938 |
| 509,459 | Great Britain | July 17, 1939 |